(12) United States Patent
Cosentino et al.

(10) Patent No.: US 12,208,768 B2
(45) Date of Patent: Jan. 28, 2025

(54) AUTHENTICATING ELECTRONIC KEY DEVICES

(71) Applicant: Red Hat, Inc., Raleigh, NC (US)

(72) Inventors: Andrea Cosentino, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 290 days.

(21) Appl. No.: 17/672,609

(22) Filed: Feb. 15, 2022

(65) Prior Publication Data

US 2023/0256936 A1 Aug. 17, 2023

(51) Int. Cl.
| | |
|---|---|
| *B60R 25/24* | (2013.01) |
| *B60R 25/04* | (2013.01) |
| *H04L 9/06* | (2006.01) |
| *H04L 9/08* | (2006.01) |

(52) U.S. Cl.
CPC ............ *B60R 25/24* (2013.01); *B60R 25/04* (2013.01); *H04L 9/0643* (2013.01); *H04L 9/0861* (2013.01); *H04L 2209/84* (2013.01)

(58) Field of Classification Search
CPC ....... B60R 25/24; B60R 25/04; H04L 9/0643; H04L 9/0861; H04L 2209/84
See application file for complete search history.

(56) References Cited

U.S. PATENT DOCUMENTS

| | | | | |
|---|---|---|---|---|
| 9,571,284 B2* | 2/2017 | Leboeuf | ................ | H04L 9/3226 |
| 10,403,071 B2* | 9/2019 | Endo | ......................... | G07C 9/28 |
| 11,328,543 B2* | 5/2022 | Lundberg | ............... | H04L 63/108 |
| 2015/0239357 A1* | 8/2015 | Huntzicker | ............. | B60L 53/68 |
| | | | | 701/22 |
| 2016/0098870 A1* | 4/2016 | Bergerhoff | .............. | H04W 4/48 |
| | | | | 340/5.61 |
| 2018/0134253 A1* | 5/2018 | Zielinski | ................ | H04L 9/0618 |
| 2019/0266821 A1* | 8/2019 | Balakrishna | .......... | B60R 25/245 |
| 2021/0218692 A1* | 7/2021 | Higuchi | ................... | H04L 67/12 |
| 2021/0312723 A1* | 10/2021 | Santos | .................... | G07C 5/008 |

FOREIGN PATENT DOCUMENTS

CN 113300836 A 8/2021

* cited by examiner

*Primary Examiner* — Thomas D Alunkal
(74) *Attorney, Agent, or Firm* — Womble Bond Dickinson (US) LLP

(57) ABSTRACT

An example method may include receiving, from a key device, a first counter value and a first encoded counter value, identifying, among one or more mapping table entries in an access control unit mapping table, an access control unit mapping table entry specifying a second counter value that corresponds to the received first counter value, determining whether a second encoded counter value specified by the identified access control unit mapping table entry corresponds to the received first encoded counter value, and responsive to determining that the second encoded counter value corresponds to the received first encoded counter value, sending, to a control unit, an indication that permission is granted. The first encoded counter value may include a cryptographic encoding of the first counter value generated in view of a secret key.

20 Claims, 11 Drawing Sheets

Access Control Unit Mapping Table
(e.g., ECU Mapping Table)
200

| ECU Counter (cleartext) | Cryptographically-Encoded ECU Counter | Expiration |
| --- | --- | --- |
| 1 | Hash(1 \| ECU Secret Key) | 20 January 2022 at 09:30 |
| 2 | Hash(2 \| ECU Secret Key) | 20 January 2022 at 09:40 |
| 14 | Hash(14 \| ECU Secret Key) | 20 January 2022 at 10:00 |

FIG. 2A

Key Device Mapping Table
210

| Key Device Counter (cleartext) | Cryptographically-Encoded Received Counter |
| --- | --- |
| 1 | Hash(1 \| Key Device Secret Key) |
| 2 | Hash(2 \| Key Device Secret Key) |

Receive, from an access control unit, a counter value and an encoded counter value, wherein the counter value is associated with a request to perform an operation, and the encoded counter value comprises a cryptographic encoding of the counter value generated in view of a secret key 410

Store, in an access control unit mapping table, an access control unit mapping entry specifying the counter value and the encoded counter value 420

Send a notification to a key device, wherein the notification comprises a request for an encoded key device counter value 430

Receive, from a key device, a first counter value and a first encoded counter value 440

Identify, among one or more mapping table entries in an access control unit mapping table, an access control unit mapping table entry specifying a second counter value that corresponds to the received first counter value 450

Determine whether a second encoded counter value specified by the identified access control unit mapping table entry corresponds to the received first encoded counter value 460

Responsive to determining that the second encoded counter value corresponds to the received first encoded counter value, send, to a control unit, an indication that permission is granted 470

FIG. 4B

AUTHENTICATING ELECTRONIC KEY DEVICES

TECHNICAL FIELD

The present disclosure is generally related electronic security devices, and more particularly, to authenticating electronic key devices.

BACKGROUND

Remote keyless entry systems can control access to a vehicle without the use of a mechanical key. Instead, remote keyless entry systems use an electronic key device that transmits radio signals to a receiver in the vehicle. The radio signals can encode data that is specific to a particular vehicle. If the receiver detects a signal having data that corresponds to the vehicle, then the remote keyless entry system can allow access to the vehicle, e.g., by locking or unlocking doors, or enabling the vehicle's ignition system so that the vehicle's engine can be started. Prior to enabling the ignition system, the remote keyless entry system can triangulate the location of the electronic key and verify that the key is located inside the vehicle.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2A depicts an example data structure representing an access control unit mapping table, in accordance with one or more aspects of the present disclosure;

FIG. 2B depicts example data structure representing a key device mapping table, in accordance with one or more aspects of the present disclosure;

FIG. 4A depicts a flow diagram of an example method for a coordinator to prepare to verify vehicle action requests, in accordance with one or more aspects of the present disclosure;

FIG. 4B depicts a flow diagram of an example method for a coordinator to verify vehicle action requests, in accordance with one or more aspects of the present disclosure;

DETAILED DESCRIPTION

Figure 1:
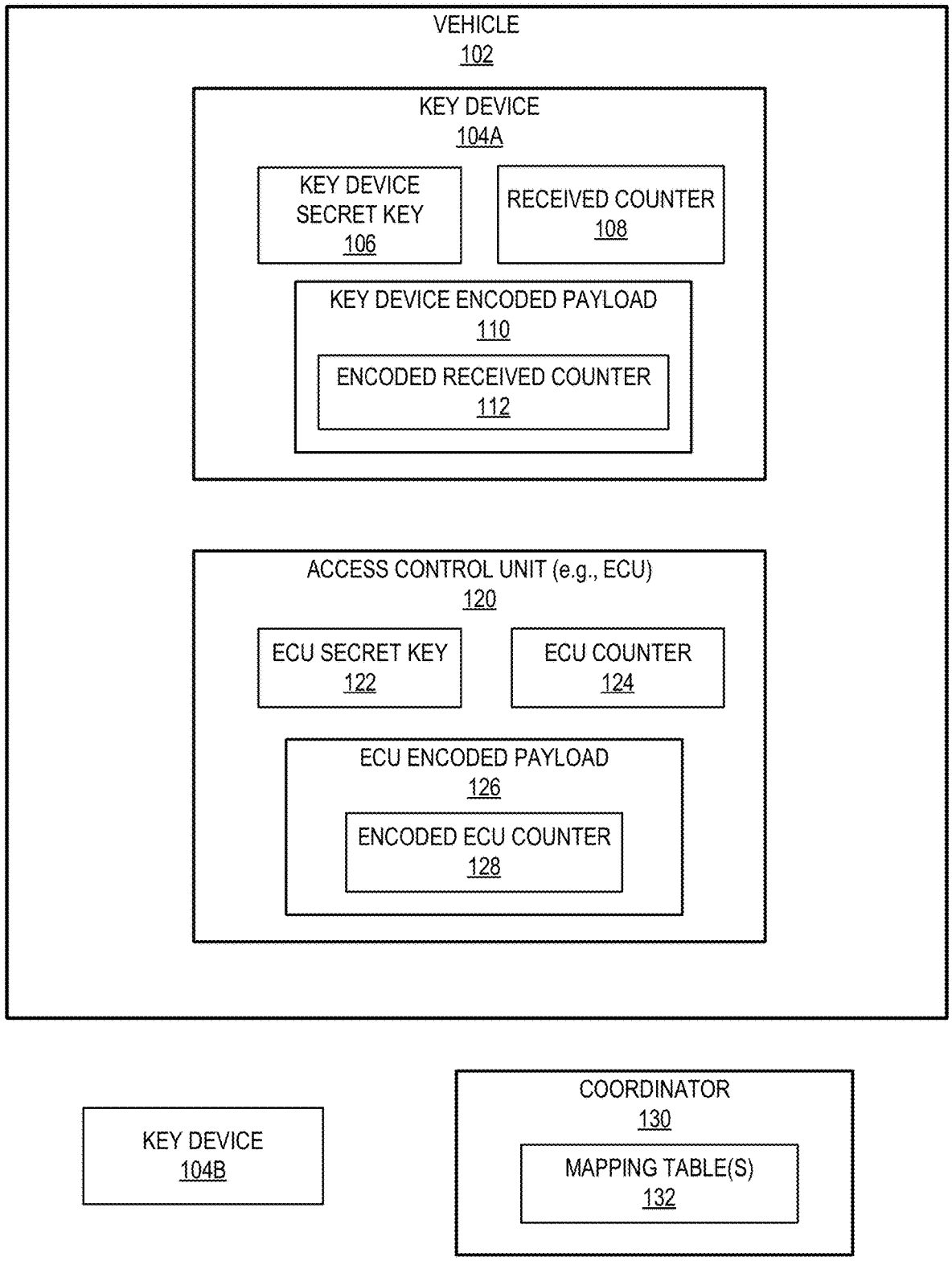
FIG. 1 depicts a high-level block diagram of an example remote keyless entry system that performs verification of transmitted key signals, in accordance with one or more aspects of the present disclosure.

Described herein are systems and methods for authenticating electronic key devices. An electronic security system can control access to a protected area or device using an electronic key device. If the electronic key device is in physical proximity of the protected area or device, the electronic security system may grant access permission to the protected area or device. For example, a remote keyless entry ("RKE") system can control access to a vehicle using an electronic key device, which is referred to herein as a "key fob." An access code for a particular vehicle can be programmed into the key device, and the key device can transmit a signal representing the access code on a particular radio frequency.

A receiver located in the vehicle can receive the signal and provide the access code to the vehicle's engine control unit ("ECU"). The ECU can determine whether the signal is valid, e.g., whether the received access code corresponds to the expected access code for the vehicle. If the signal is valid, the vehicle's engine control unit ("ECU") can grant access permission for particular operations, such as unlocking the vehicle's doors or starting the vehicle's engine.

However, remote keyless entry systems can have security vulnerabilities that are exploitable to gain unauthorized access to vehicle functions. For example, a signal recording device located near the vehicle can be used to capture and record the signal from a key fob. The recording device can then re-transmit the captured signal, thereby sending the expected access code to the vehicle in what appears to be a valid signal. Some RKE systems attempt to prevent such replay exploits by requiring that a valid signal be received from a transmitter located inside the vehicle. For example, antennas located in the vehicle can be used to determine the key fob's physical location via triangulation. If the RKE determines that the key fob is located inside the vehicle, and the received access code is valid for the vehicle, then the ECU can disable an engine immobilizer. The engine can then be started when a start button in the vehicle is pressed.

Some RKE systems attempt to prevent replay exploits by implementing a rolling code. The key fob can send a code calculated according to a specified sequence of codes. The receiver can calculate an expected code according to the same sequence and verify that the received code matches the expected code. However, rolling codes are also susceptible to replay exploits. For example, a signal recording device located near the vehicle can transmit a jamming signal that prevents the receiver from receiving rolling code signals from the key fob. Since the vehicle does not respond to the code sent by the key fob, the vehicle owner is likely to use the key fob a second time to send a second code. The recording device can store the first and second code signals, then stop transmitting the jamming signal and transmit the recorded first code. Since the vehicle has not received the second code, the second code can subsequently be re-transmitted to unlock the vehicle.

Aspects of the present disclosure address the above and other deficiencies by providing technology that authenticates a key device using a security protocol in which a coordinator component verifies that a first cryptographically-encoded counter value received from the key device corresponds to a second cryptographically-encoded counter value received from an access control unit. For example, the first cryptographically-encoded counter value can be equal to the second cryptographically-encoded counter value. The access control unit or the key device can request access to a particular function, and the coordinator can send a response to the access control unit indicating whether permission is granted or denied. Each counter value can be cryptographically-encoded by computing a cryptographic hash of a combination of the counter value and a secret key, for example. The access control unit can maintain the counter value, and can increment the counter value each time the access control unit requests access to perform a function. For example, if a start button in a vehicle is pressed, the access control unit can request access to the vehicle's start function. In the vehicle example, the access control unit can be the vehicle's Engine Control Unit (ECU).

The access control unit can request access by sending an access request to the coordinator. The access control unit's access request can include a cleartext (e.g., non-encrypted) representation of the counter value and a cryptographically-encoded representation of the counter value. Further, the access control unit can send the counter value to the key device as cleartext. The key device can establish its authenticity by cryptographically encoding the received counter value using the secret key. Thus, the coordinator can request that the key device provide the current counter value. In response, the key device can send the received counter value in clear text and in cryptographically-encoded form to the coordinator. The coordinator can then determine whether the same pair of cleartext and cryptographically-encoded counter values have been received from the access control unit and the key device. That is, upon receiving a cleartext counter and cryptographically-encoded counter from the key device, the coordinator can determine whether the same cryptographically-encoded counter was has been received from the access control unit in association with the same cleartext counter value. If so, the coordinator can send a response to the access control unit indicating that permission is granted. The access control unit can proceed to allow or perform an action if permission is granted. Otherwise, if the cleartext counter values do not match, or the respective cryptographically-encoded counter values do not match, the coordinator can send a response to the access control unit indicating that permission is denied. The access control unit does not perform the action if permission is denied.

The systems and methods described herein include technical improvements to electronic key device technology. In particular, aspects of the present disclosure may prevent unauthorized devices from gaining access to functions protected by an access control unit. Since the coordinator component verifies that the same combination of cleartext counter and cryptographically-encoded counter is received from both the key device and the access control unit, unauthorized key devices, which do not have the secret key, are unable to generate a cryptographically-encoded counter that matches that received from the access control unit. Thus, the coordinator does not grant permission if an unauthorized key device sends a replayed counter value. The unauthorized key device does not have the correct secret key, and is not able to cryptographically encode the current counter value in response to the coordinator's request. The coordinator determines that the correct cryptographically-encoded current counter value is not received from the key device, and responds to the access request with an indication that permission is denied.

Various aspects of the above referenced methods and systems are described in details herein below by way of examples, rather than by way of limitation.

FIG. 1 depicts a high-level block diagram of an example remote keyless entry system that performs verification of transmitted key signals, in accordance with one or more aspects of the present disclosure. The remote keyless entry system can provide security features for a vehicle 102. For example, the vehicle 102 can require that a radio frequency signal be received from a key device 104 ("key fob") prior to performing operations such as unlocking doors or starting the vehicle's engine. The key device 104 can include a radio transmitter or communication device (e.g., a Radio Frequency Identifier (RFID) tag) from which a signal is detectable when the key device 104 is in proximity to or inside the vehicle 102. The vehicle 102 can detect the signal from the key device 104 using antennas, and can perform triangulation to determine whether the key device 104 is located inside the vehicle 102, as shown by key device 104A, or outside the vehicle, as shown by key device 104B.

An access control unit 120 can receive requests to perform a vehicle operation, determine whether the vehicle operation is permitted, and, if the operation is permitted, cause a vehicle system such as an engine control unit (ECU) to perform the requested operation. The access control unit can be a portion of an ECU of the vehicle 102, or one of a set of ECUs in the vehicle 102, for example. The access control unit 120 can communicate with the key device 104 using a suitable protocol, e.g., a wireless protocol. The key device 104 can initiate requests to perform vehicle operations, e.g., in response to a user pressing a button on the key device 104. For example, the access control unit 120 can receive a request to unlock the vehicle 120 from a key device 104B located outside the vehicle 120, and verify that the key device 104B has permission to unlock the vehicle 120. The access control unit can verify permission by determining whether a signal that encodes a particular code value has been received by a receiver located in the vehicle 102. If the signal having the particular code value is received, then the access control unit 120 can cause the vehicle's doors to be unlocked, e.g., by sending a request to a door lock controller, or to an ECU that controls the doors.

Devices in the vehicle, such as buttons or ECUs, can initiate requests to perform vehicle operations. For example, the vehicle 120 can have a start button or other feature that, when pressed or otherwise activated, causes the vehicle's engine to start if the particular code is received from a key device 104A that is determined to be located in the vehicle 102. When the start button is pressed, an ECU can send a request to the access control unit 120 to start the engine. The access control unit can verify that the key device 104A is present in the vehicle 102 by determining whether a signal that encodes a particular code value has been received. If the signal having the particular code value is received, then the access control unit 120 can cause the vehicle's engine to start, e.g., by sending a request to an engine starter, or to an ECU that controls the engine.

The access control unit 120 can verify permission to perform a requested vehicle operation by sending a request to a coordinator 130. The coordinator 130 can communicate with a key device 104 as described herein, and determine whether to grant permission to perform the operation based on a response from the key device 104. For example, a secret such as a cryptographic hash key or encryption kay can be provided to a particular key device 104 and the access control unit 120, e.g., by the vehicle manufacturer or other trusted provider. The key provided to the key device 104A is shown as a key device secret key 106, and the key provided to the access control unit 120 is shown as an ECU secret key 122. The key device secret key 106 and the ECU secret key 122 can be stored in a non-volatile memory of the key device 104A and access control unit 120, respectively. A key device 104A can be authorized to provide access to a vehicle 102, e.g., by the vehicle manufacturer or other trusted provider. A key device 104A that is authorized to provide access to a vehicle 102 is referred to herein as an authorized key device for the vehicle 102. The secret key 106 of a key device 104A that is authorized to provide access to a vehicle 102 has the same value as the ECU secret key 122 of the vehicle's access control unit 120.

The coordinator 130 can be a network-accessible function provided by a network server, For example, the coordinator 130 can be implemented as a serverless function provided by a cloud service. "Serverless function" herein shall refer to program code that is hosted by a server of a cloud service or other infrastructure provider. Thus, the coordinator 130 need not include a network server. Instead, the coordinator 130 can perform the operations described herein while server-related operations, such as the implementation of waiting for requests and sending responses, can be performed by a server that interacts with the serverless function.

The access control unit 120 can request permission to perform an operation from the coordinator 130. The coordinator 130 can respond with an indication that permission is granted or an indication that permission is denied. If the coordinator 130 indicates that permission is granted, the access control unit 120 can perform the requested operation, or cause another component of the vehicle 102 to perform the requested operation. Otherwise, if the response indicates that permission is denied, the access control unit 120 does not perform or cause the requested operation to be performed. The operation can be, for example, starting the vehicle's engine, locking the vehicle's door locks, or other operation that is to be restricted to users who are in possession of an authorized key device 104A for the vehicle 102.

To determine whether a key device 104A is the authorized key device for the vehicle 102, the access control unit 120 can initiate an authorization protocol as described below. Upon completion of the authentication protocol, the coordinator 130 can send a response to the access control unit 120 indicating whether the key device 104A is authorized for the vehicle 102. The coordinator 130 can be, e.g., a serverless function hosted by a cloud service. To send a request to the coordinator 130, the access control unit 120 can invoke the cloud function. The response from the coordinator 130 can be received by the access control unit 120 as an output result from the cloud function.

To prevent replay exploits in which a recording device captures and replays a signal from an authorized key device 104, the access control unit 120 can maintain an ECU counter 124. The ECU counter 124 can initially be set to a starting value, e.g., 1, by the manufacturer of the access control unit 120. The access control unit 120 can increment the ECU counter 124 for each permission request. The access control unit 120 can also increment the ECU counter 124 in response to other conditions or events, e.g., after a threshold amount of time has elapsed. The key device 104A can maintain a separate counter 108, which can be updated as described below.

To initiate the secure authorization protocol, the access control unit 120 can perform a secure mutual authentication protocol, such as a secure mutual authentication protocol for RFID using elliptic curve cryptography or other suitable protocol that the access control unit 120 and key device 104A can each use to verify the other's identity. Upon successfully completing the secure mutual authentication protocol, the access control unit 120 can generate an encoded ECU counter 128 by cryptographically-encoding the current value of the ECU counter 124 using the ECU secret key 122. For example, the ECU counter 124 can be cryptographically encoded by computing a cryptographic hash of a combination (e.g., concatenation) of the ECU counter 124 and the ECU secret key 122.

The access control unit 120 can send the ECU counter 124 (e.g., in cleartext) and the cryptographically-encoded ECU counter 128 to the coordinator 130 (e.g., as an ECU encoded payload 126). The access control unit 120 can also then send the ECU counter 124 to the key device 104A (e.g., in cleartext). The coordinator 130 can store the received ECU counter 124 and the received ECU encoded payload 126 in an entry in a data structure associated with the access control unit 120, such as a mapping table 132. The coordinator 130 can then send a notification or other communication to the key device 104A to request that the key device 104A generate and send a cryptographically-encoded payload (based on the counter value that the access control unit 120 sent to the key device 104A, as described above).

The key device 104A can receive the notification or other communication and generate an encoded received counter 112. For example, the key device 104A can generate an encoded received counter 112 by cryptographically-encoding the current value of the received counter 108 using the key device secret key 106. For example, the received counter 108 can be cryptographically encoded by computing a cryptographic hash of a combination (e.g., concatenation) of the received counter 108 and the key device secret key 106. The key device 104A can use the same cryptographic hash function as the access control unit 120.

The key device 104A can send the received ECU counter 108 (e.g., in cleartext) and the encoded received counter 112 to the coordinator 130 (e.g., as a key device encoded payload 110). The coordinator 130 can store the received key device counter 108 and the received key device encoded payload 110 in an entry in a data structure associated with the key device 104A, such as a mapping table 132. The coordinator 130 can then compare the key device encoded payload 110 to an ECU encoded payload 126 stored in a mapping table 132 in association with the value of the received key device counter 108, if such an entry exists in the mapping table 132. If the comparison indicates that the key device encoded payload 110 is equal to the ECU encoded payload 126 stored in the mapping table 132, then the coordinator 130 can send a response to the access control unit 120 indicating that permission is granted. Otherwise, the coordinator 130 can send a respond to the access control unit 120 indicating that permission is denied. If permission is granted, the access control unit 120 can perform the requested operation or cause another component of the vehicle 102 to perform the requested operation. The access control unit 120 can increment the ECU counter 124 regardless of whether permission is granted or denied.

FIG. 2A depicts an example data structure representing an access control unit mapping table 200, in accordance with one or more aspects of the present disclosure. The example access control unit mapping table 200 includes three entries, each corresponding to a particular ECU counter value 202. The entries of the key device mapping table 210 represent counter values associated with an access control unit 120. The mapping table 200 can be stored in a memory of the coordinator 130 and/or in a database hosted by a cloud provider, for example.

Each mapping table entry in the table 200 specifies an ECU counter (in cleartext) 202, a cryptographically-encoded ECU counter 204, and an expiration 206. The expiration 206 corresponds to a time to live of the ECU counter specified by the mapping table entry. A first mapping table entry specifies a cleartext ECU counter 202 of 1, a cryptographically-encoded ECU counter 204 shown as Hash(1|ECU Secret Key), and an expiration time of 20 Jan. 2022 at 09:30 (where the vertical bar | indicates concatenation of the counter 1 with the ECU secret key). The encoded ECU counter 202 value of Hash(1|ECU Secret Key) represents a cryptographic hash (using an appropriate cryptographic hash algorithm) of the data formed by concatenating the value 1 and the ECU secret key. A second mapping table entry specifies a cleartext ECU counter 202 of 2, a cryptographically-encoded ECU counter 204 shown as Hash(2|ECU Secret Key), and an expiration time of 20 Jan. 2022 at 09:40. A third mapping table entry specifies a cleartext ECU counter 202 of 14, a cryptographically-encoded ECU counter 204 shown as Hash(14|ECU Secret Key), and an expiration time of 20 Jan. 2022 at 10:00.

FIG. 2B depicts example data structure representing a key device mapping table 210, in accordance with one or more aspects of the present disclosure. The example key device mapping table 210 includes two entries, each corresponding to a particular ECU counter value 202. The entries of the key device mapping table 210 represent counters associated with a key device 104. The mapping table 210 can be stored in a memory of the coordinator 130 and/or in a database hosted by a cloud provider, for example. Although shown as separate mapping tables 200, 210 the mapping tables 200, 210 can alternatively be combined into a single mapping table in which each entry specifies whether the entry is associated with a access control unit 120 or a key device 104.

Each mapping table entry in the table 210 specifies a key device counter (in cleartext) 212 and a cryptographically-encoded key device counter 214. A first mapping table entry specifies a cleartext key device counter 212 of 1 and a cryptographically-encoded key device counter 214 shown as Hash(1|Key Device Secret Key). A second mapping table entry specifies a cleartext key device counter 212 of 2 and a cryptographically-encoded key device counter 214 shown as Hash(2|Key Device Secret Key).

Figure 3A:
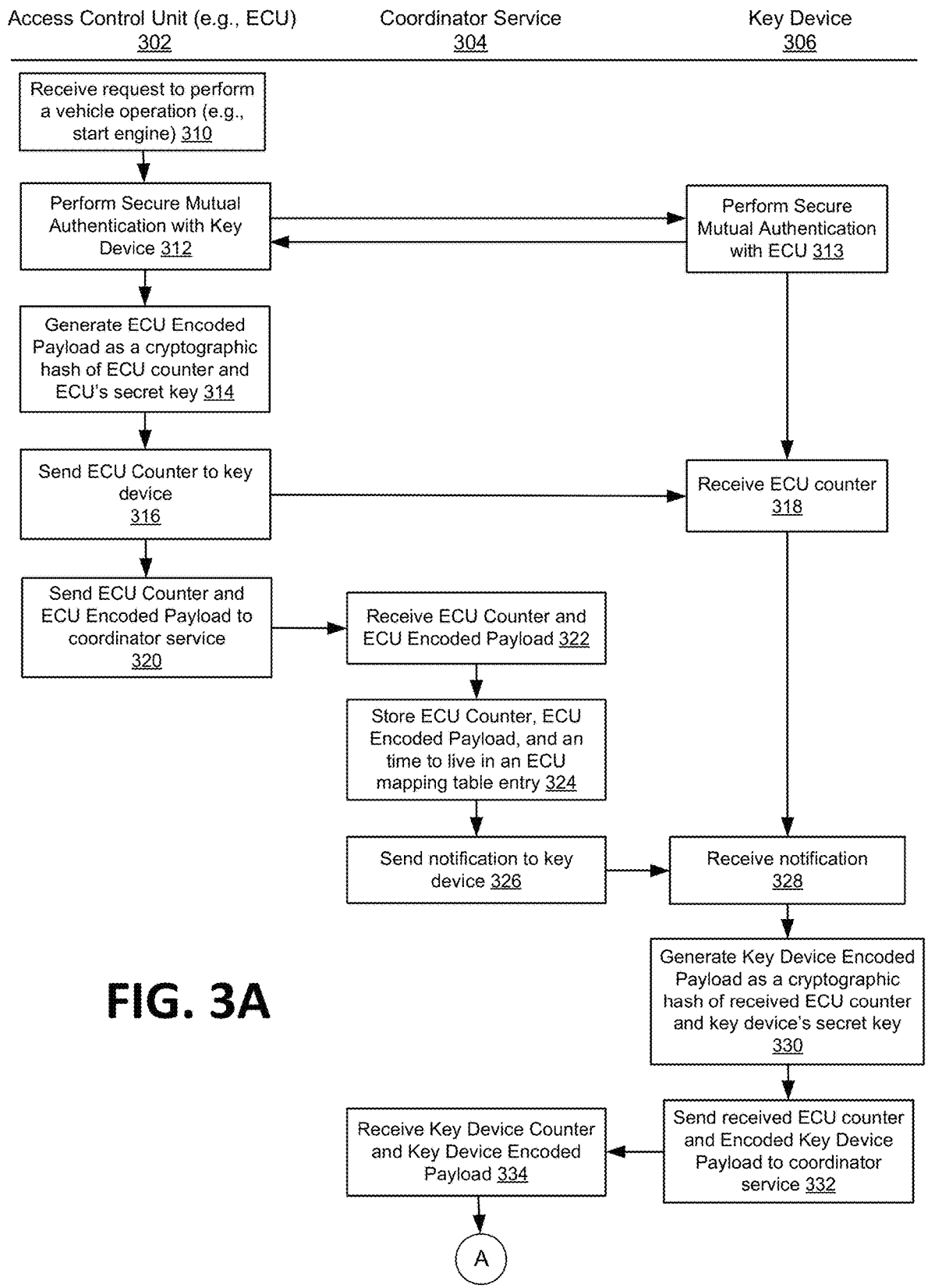
FIGS. 3A and 3B depict interaction diagrams of example interactions between a control unit, a coordinator service, and a key device, in accordance with one or more aspects of the present disclosure.
Figure 3B:
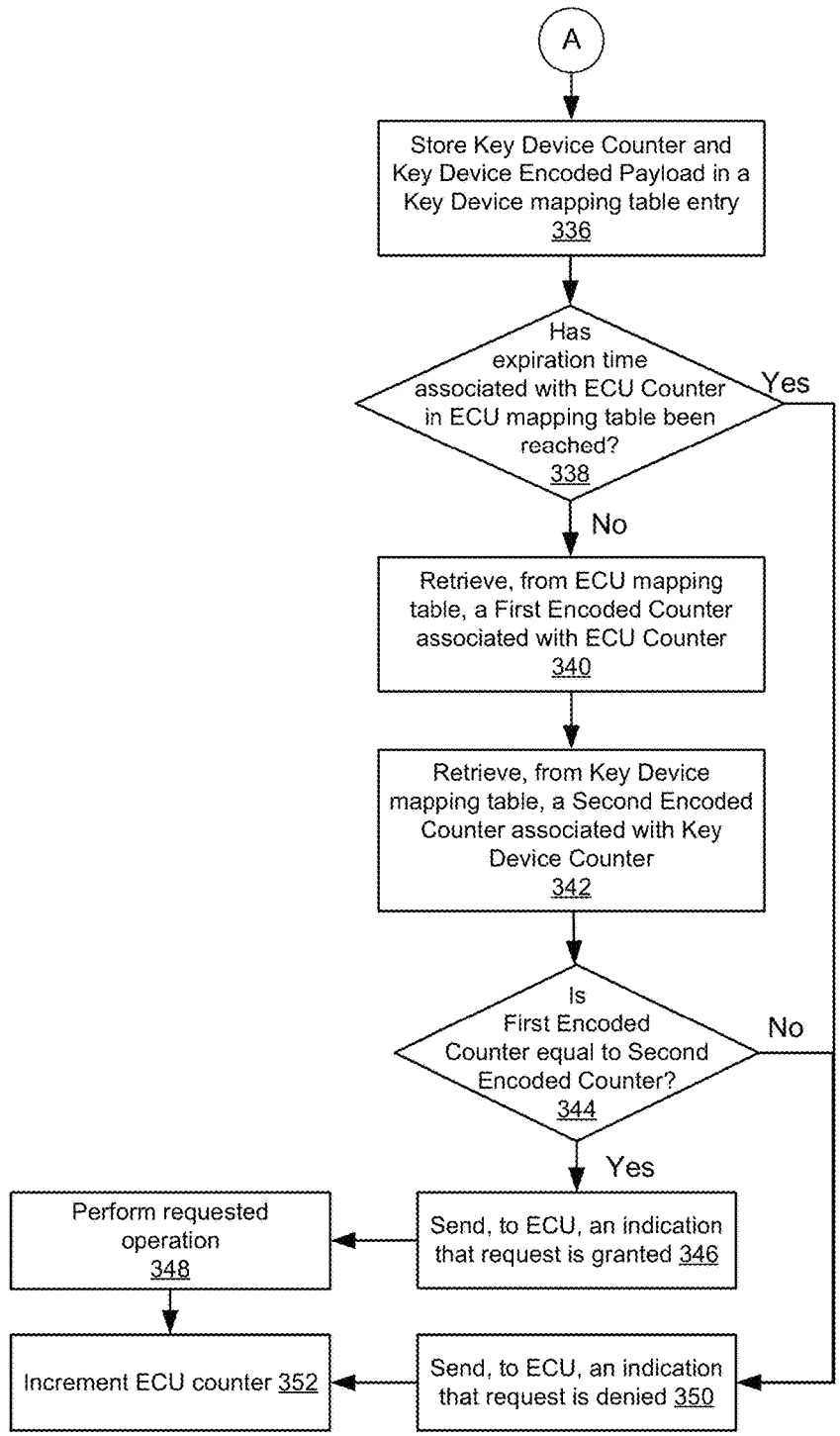

FIGS. 3A and 3B depict interaction diagrams of example interactions between a control unit, a coordinator service, and a key device, in accordance with one or more aspects of the present disclosure. At operation 310, an access control unit ("ECU") 302 can receive a request to perform a vehicle operation such as starting an engine. At operation 310, the ECU 302 can also verify that it has access to a network that can be used to communicate with a coordinator service 304. If network access is not available, the ECU 302 can use an alternative technique to verify the key device 306, such as verifying a code value provided by the key device as described above. If network access is available, then the ECU 302 performs operation 312. At operation 312, the ECU 302 can perform a portion of a secure mutual authentication protocol. At operation 313, the key device 306 can perform a portion of the secure mutual authentication protocol. Subsequent to operation 312, the ECU 302 has information about the identity of the key device 306, and the identity of the key device 306 has been verified (e.g., the key device 306 has been determined to be genuine). If the secure mutual authentication protocol fails, then the ECU 302 and key device 306 do not proceed further in the example interaction, and the request to perform the vehicle operation is denied.

At operation 314, the ECU 302 can generate an ECU encoded payload 126 as a cryptographic hash of a combination (e.g. concatenation) of an ECU counter 124 and an ECU secret key 122. At operation 316, the ECU 302 can send the ECU counter 124 to the key device 306. The ECU 302 can send the ECU counter in cleartext or in a suitable encoding that can be decoded by the key device 306. At operation 318, the key device 306 can receive the ECU counter 124. The counter received by the key device 306 at operation 318 is referred to herein as a received counter 108. Subsequent to operation 318, the key device 306 waits for a notification, which is receives at operation 328, as described below.

At operation 320, the ECU 302 sends the ECU counter 124 and the ECU encoded payload 126 that contains the encoded ECU counter 128 to the coordinator service 304. The ECU encoded payload 126 can be the same as the encoded ECU counter 128, or can include additional information, e.g., data type or size information for the encoded ECU counter 128. The ECU counter 124 can be sent in cleartext or in a suitable encoding that can be decoded by the coordinator service 304.

The coordinator service 304 can perform operation 322 in response to receiving a counter and encoded payload from the ECU 302. Alternatively, the coordinator service 304 can perform operation 334 in response to receiving a counter and encoded payload from the key device 306. To determine whether to perform operation 322 or 334 in response to receiving a counter and encoded payload, the coordinator service 304 can evaluate a sender identifier included in a received message or request associated with the received counter or encoded payload. If the sender identifier identifies the ECU 302, then the coordinator service 304 can perform operation 322. Otherwise, if the sender identifier identifies the key device 306, then the coordinator service 304 can perform operation 334. Other criteria can be used to determine whether to perform operation 322 or 344. For example, the coordinator service 304 can evaluate a different attribute of the received message or request, such as a request type that specifies whether the request is a request to store an ECU counter and payload or a request to store a key device counter and payload. Thus, the coordinator service 304 can perform operation 322 in response to determining that the received counter value and encoded payload are sent by the ECU 302. Similarly, the coordinator service 304 can perform operation 334 in response to determining that the received counter value and encoded payload are sent by the key device 306.

At operation 322, the coordinator service 304 can receive the ECU counter 124 and the ECU encoded payload 126. At operation 324, the coordinator service 304 can store the ECU counter 124 and the encoded ECU counter 128 in an entry of the access control unit mapping table 200. The coordinator service 304 can also generate an expiration time for the encoded ECU counter 128. The expiration time can be, for example, a specific time in the future, e.g., 30 seconds, 1 minute, 5 minutes, or other suitable time in the future. The difference between the current time and the expiration time corresponds to a time to live of the counter value. Subsequent to the expiration time, the counter value is invalid, so the entry containing the counter value no longer represents a valid counter, and can be deleted from the mapping table 200. At operation 326, the coordinator service 304 can send a notification to the coordinator service 304. The notification can be a request for the key device 304 to send the received counter 108 and the key device encoded payload 110 to the coordinator service 304.

At operation 328, the key device 306 can receive the notification from the coordinator service 304. At operation 330, the key device 306 can generate a key device encoded payload 110 as a cryptographic hash of a combination (e.g., concatenation) of the received counter 108 and a key device secret key 106. At operation 332, the key device 306 can send the received counter 108 and the key device encoded payload 110 to the coordinator service 304. The key device encoded payload 110 can be the same as the encoded received counter 112, or can include additional information as described above for the ECU encoded payload 126. The key device 306 can send the received counter 108 in cleartext or in a suitable encoding that can be decoded by the coordinator service 304.

At operation 334, the coordinator service 304 can receive the received counter 108 and the key device encoded payload 110. The received counter 108 is referred to herein as a "key device counter" at the coordinator service 304. As shown in FIG. 3B, at operation 336, the coordinator service 304 can store the key device counter and the key device encoded payload received from the key device 306 in a key device mapping table entry of the key device mapping table 210.

At operation 338, the coordinator service 304 can determine whether the expiration time associated with the ECU counter in the ECU mapping table 200 has been reached. If so, the coordinator service 304 can perform operation 350, which sends an indication that the request is denied to the ECU 302. Otherwise, if the expiration time has not been reached, then the ECU counter is not expired, and the coordinator service 304 can perform operation 340. At operation 340, the coordinator service 304 can retrieve, from the ECU mapping table 200, a first encoded counter associated with the ECU counter. For example, if the ECU counter is 2, then operation 340 access the entry having an ECU counter of 2 in the ECU mapping table 200 and retrieves the encoded ECU counter value of Hash(2|ECU Secret Key) from the entry. Alternatively, an encoded payload containing the encoded ECU counter value can be stored in and retrieved from the mapping table 200.

At operation 342, the coordinator service 304 can retrieve, from the key device mapping table 210, a second encoded counter associated with the key device counter. For example, if the key device counter is 2, then operation 342 retrieves the entry having a Key Device Counter of 2 in the key device mapping table 210 and retrieves the encoded ECU counter value of Hash(2|Key Device Secret Key) from the entry. Alternatively, an encoded payload containing the encoded key device counter value can be stored in and retrieved from the mapping table 210.

At operation 344, the coordinator service 304 can determine whether the first encoded counter is equal to the second encoded counter. For example, if both the first and second encoded counters have the value of Hash(2|Key Device Secret Key), then the encoded counters are equal. If the first encoded counter is equal to the second encoded counter, then at operation 346 the coordinator service 304 can send, to the ECU, an indication that the request is granted. At operation 348, the ECU 302 can receive the indication and perform the requested operation. The ECU 302 can then perform operation 352, which can increment the ECU counter. Otherwise, if operation 344 determines that the first encoded counter is not equal to the second encoded counter, then at operation 350 the coordinator service 304 can send an indication that the request is denied to the ECU 302, and the ECU 302 can receive the indication and increment the ECU counter at operation 352. If the request is granted, the ECU 302 can perform the requested operation, or cause another component of the vehicle 102 to perform the requested operation.

If the request is not granted, the ECU 302 does not perform the requested operation and does not cause another component of the vehicle to perform the requested operation.

FIG. 4A depicts a flow diagram of an example method 400 for a coordinator to prepare to verify vehicle action requests, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a coordinator 130 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a host computer system 100 may receive, from an access control unit, a counter value and an encoded payload, wherein the counter value is associated with a request to perform an operation, and the encoded payload comprises a cryptographic encoding of the counter value generated in view of a secret key. At block 420, the host computer system may store, in an access control unit mapping table, an access control unit mapping entry specifying the counter value and the encoded counter value. At block 430, the host computer system may send a notification to a key device, wherein the notification comprises a request for an encoded key device counter value. Responsive to completing the operations described herein above with reference to block 430, the method may terminate.

FIG. 4B depicts a flow diagram of an example method 401 for a coordinator to verify vehicle action requests, in accordance with one or more aspects of the present disclosure. Method 401 and each of its individual functions, routines, subroutines, or operations may be performed by one or more processors of the computer device executing the method. In certain implementations, method 401 may be performed by a single processing thread. Alternatively, method 401 may be performed by two or more processing threads, each thread executing one or more individual functions, routines, subroutines, or operations of the method. In an illustrative example, the processing threads implementing method 401 may be synchronized (e.g., using semaphores, critical sections, and/or other thread synchronization mechanisms). Alternatively, the processes implementing method 401 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 401 may be performed by a coordinator 130 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 401 may be performed by processing devices of a server device or a client device and may begin at block 410. At block 440, a host computer system 100 may receive, from a key device, a first counter value and a first encoded counter value. At block 450, the host computer system may identify, among one or more mapping table entries in an access control unit mapping table, an access control unit mapping table entry specifying a second counter value that corresponds to the received first counter value. In an illustrative example, to identify the one or more mapping table entries, the host computer system may search the access control unit mapping table for an entry that specifies a second counter value that is equal to the received first counter value. In another illustrative example, entry can specify a second counter value that is a mathematical function of the received first counter value (e.g., a linear function of the received first counter value or a non-linear function of the received first counter value).

At block 460, the host computer system may determine whether a second encoded counter value specified by the identified access control unit mapping table entry corresponds to the received first encoded counter value. At block 470, the host computer system may, responsive to determining that the second encoded counter value corresponds to the received first encoded counter value, send, to a control unit, an indication that permission is granted. Responsive to completing the operations described herein above with reference to block 470, the method may terminate.

Figure 5:
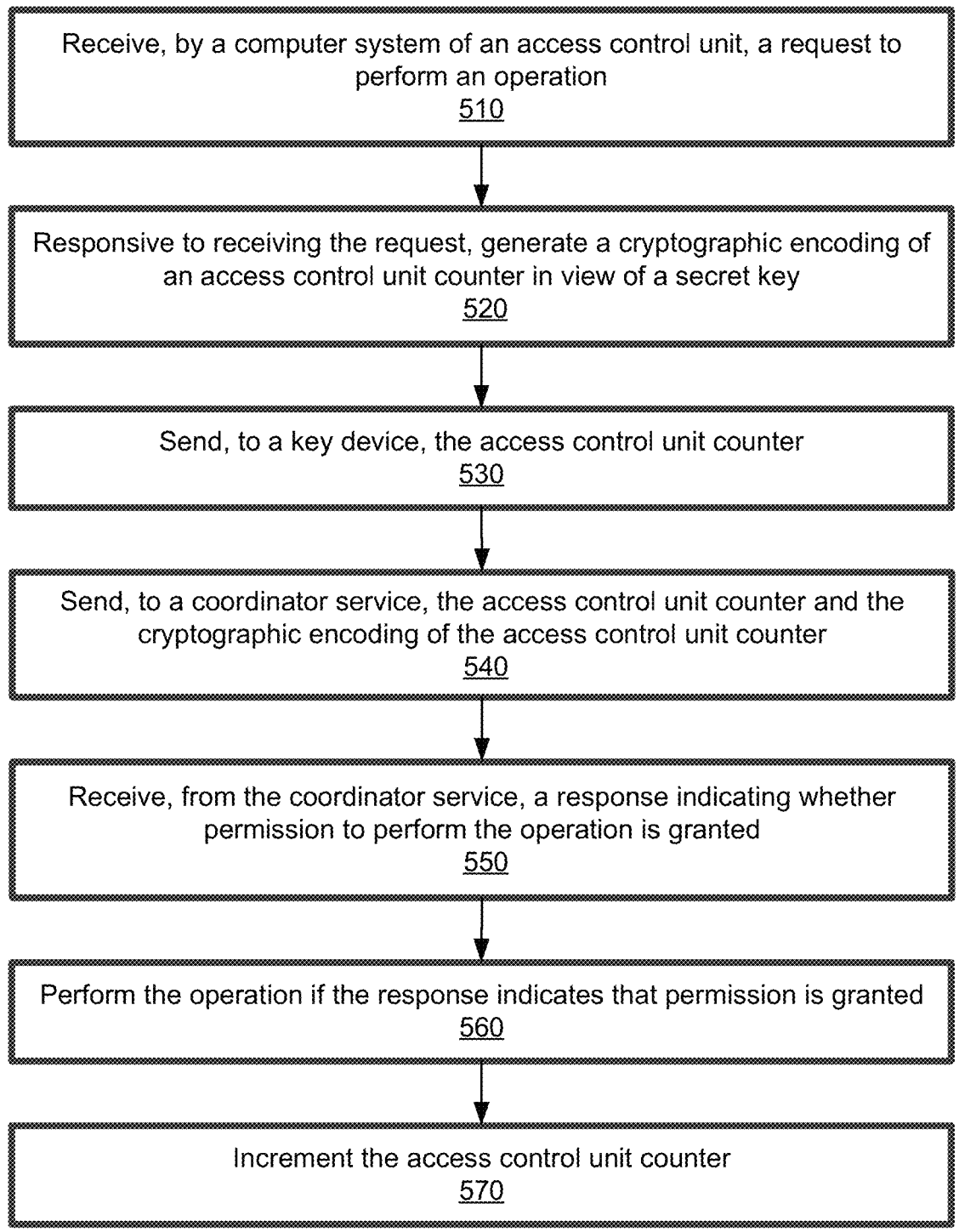
FIG. 5 depicts a flow diagram of an example method for an access control unit to communicate with a key device and a coordinator, in accordance with one or more aspects of the present disclosure.

FIG. 5 depicts a flow diagram of an example method 500 for an access control unit to communicate with a key device and a coordinator, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by an access control unit 120 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at block 510. At block 510, a host computer system 100 may receive a request to perform an operation. At block 520, the host computer system may, responsive to receiving the request, generate a cryptographic encoding of an access control unit counter in view of a secret key. At block 530, the host computer system may send, to a key device, the access control unit counter.

At block 540, the host computer system may send, to a coordinator service, the access control unit counter and the cryptographic encoding of the access control unit counter. At block 550, the host computer system may receive, from the coordinator service, a response indicating whether permission to perform the operation is granted. At block 560, the host computer system may perform the operation if the response indicates that permission is granted. At block 570, the host computer system may increment the access control unit counter. The host computer system may increment the access control unit counter when permission is granted as well as when permission is not granted. Responsive to completing the operations described herein above with reference to block 570, the method may terminate.

Figure 6:
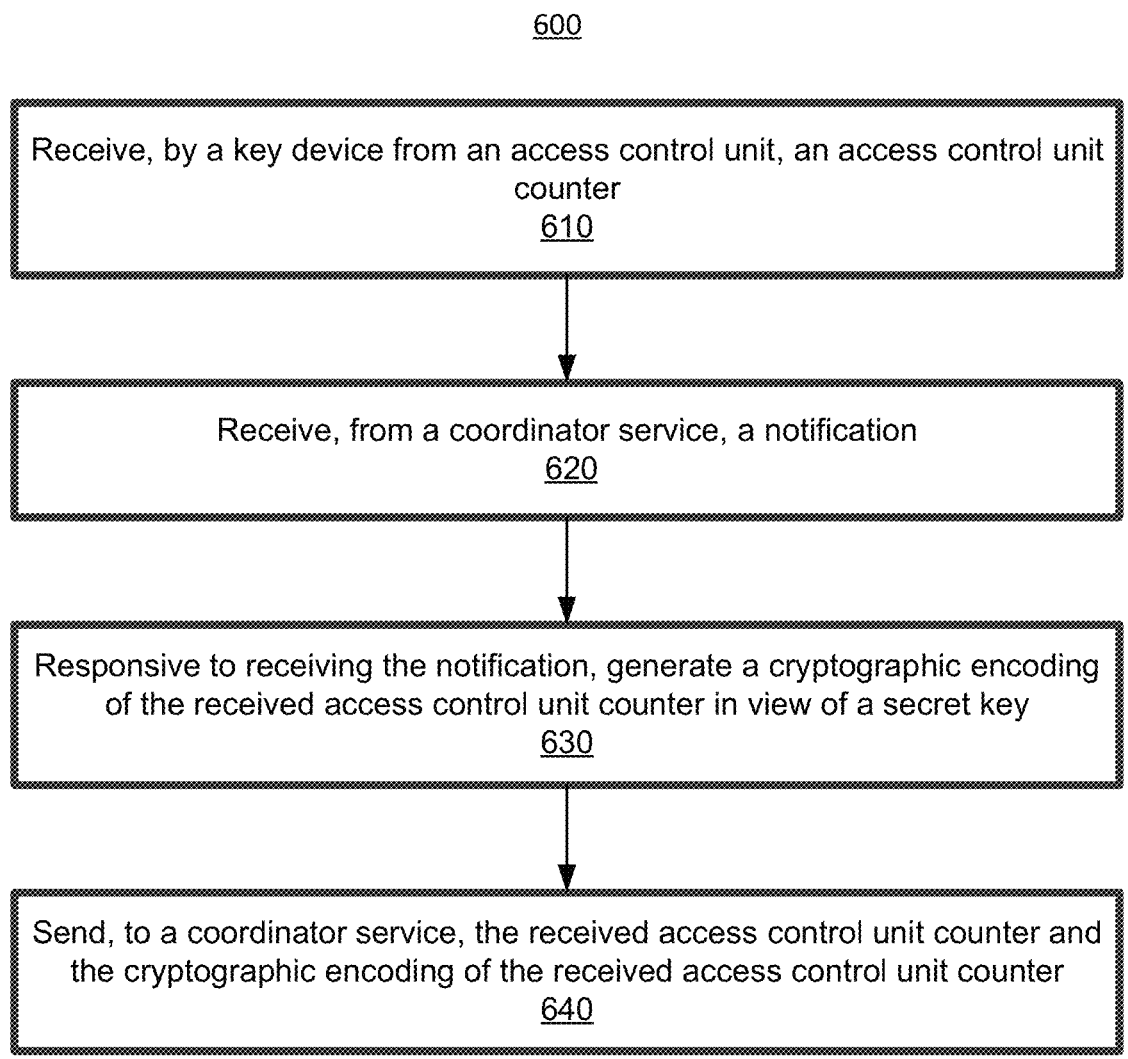
FIG. 6 depicts a flow diagram of an example method for a key device to cryptographically encode a counter using a secret key and send the encoded counter to a coordinator, in accordance with one or more aspects of the present disclosure.

FIG. 6 depicts a flow diagram of an example method 600 for a key device to cryptographically encode a counter using a secret key and send the encoded counter to a coordinator, in accordance with one or more aspects of the present disclosure. Method 600 and each of its individual functions, routines, subroutines, or operations may be performed by one or more processors of the computer device executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processes implementing method 600 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 600 may be performed by a key device 104 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 600 may begin at block 610. At block 610, a key device 104 may receive, by a key device, an access control unit counter. The access control unit counter may be received in cleartext or in a format that the key device 104 can decode. At block 620, the key device 104 may receive, from a coordinator service, a notification. The notification may be a request for the key device to send the access control unit counter value and a cryptographic encoding of the access control unit counter value, for example. At block 630, the key device 104 may, responsive to receiving the notification, generate a cryptographic encoding of the received access control unit counter in view of a secret key. At block 640, the key device 104 may send, to a coordinator service, the received access control unit counter and the cryptographic encoding of the received access control unit counter. Responsive to completing the operations described herein above with reference to block 640, the method may terminate.

Figure 7:
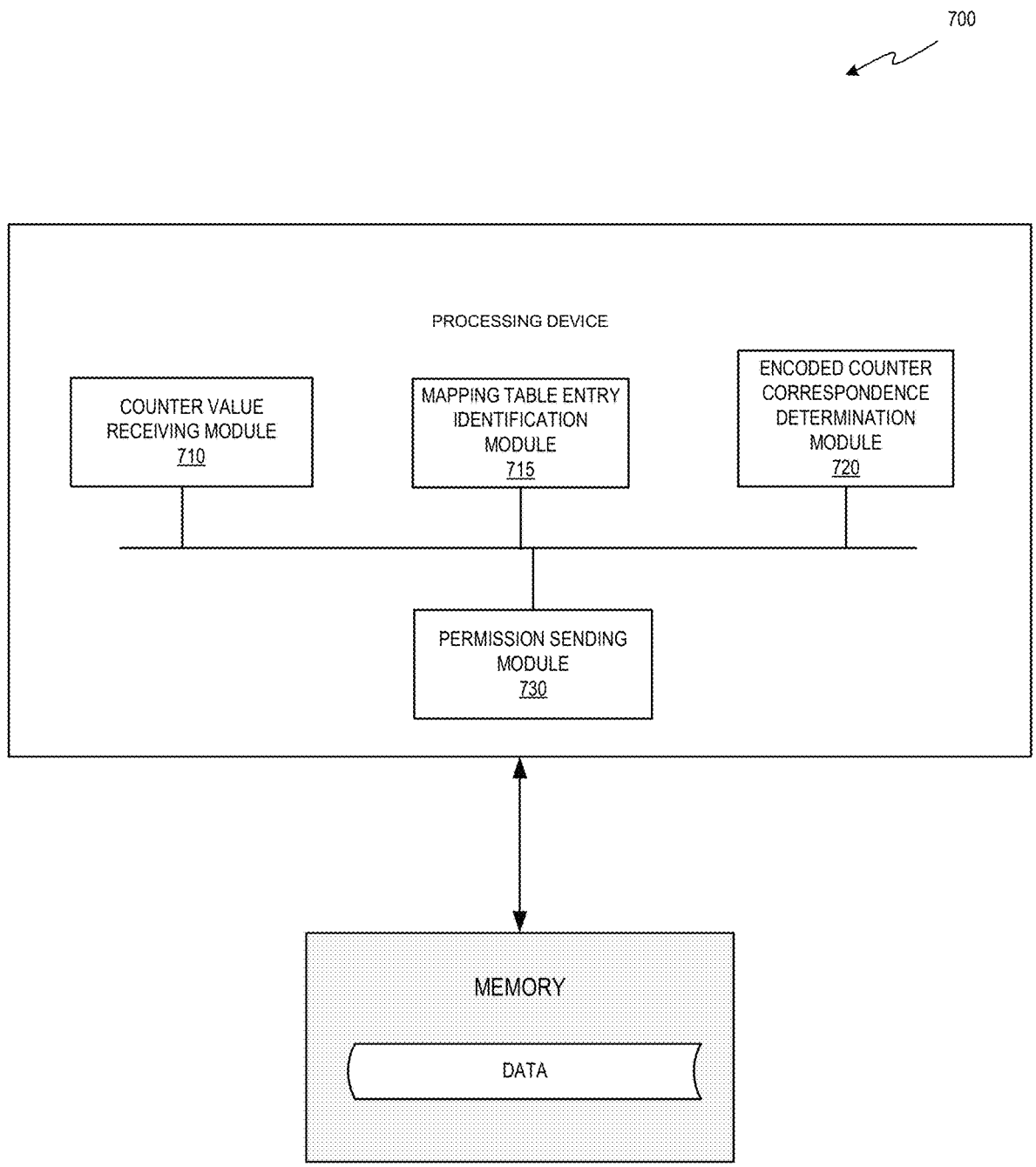
FIGS. 7, 8 and 9 depict block diagrams of example computer systems in accordance with one or more aspects of the present disclosure.

FIG. 7 depicts a block diagram of an example computer system 700 operating in accordance with one or more aspects of the present disclosure. Computer system 700 may be the same or similar to coordinator 130 of FIG. 1, and may include one or more processors and one or more memory devices. In the example shown, computer system 700 may include a counter value receiving module 710, a mapping table entry identification module 715, an encoded counter correspondence determination module 720, and a permission sending module 730.

Counter value receiving module 710 may enable a processor to receive, from a key device, a first counter value and a first encoded counter value. Mapping table entry identification module 715 may enable the processor to identify, among one or more mapping table entries in an access control unit mapping table, an access control unit mapping table entry specifying a second counter value that corresponds to the received first counter value.

Encoded counter correspondence determination module 720 may enable the processor to determine whether a second encoded counter value specified by the identified access control unit mapping table entry corresponds to the received first encoded counter value. Permission sending module 730 may enable the processor to, responsive to determining that the second encoded counter value corresponds to the received first encoded counter value, send, to a control unit, an indication that permission is granted.

Figure 8:
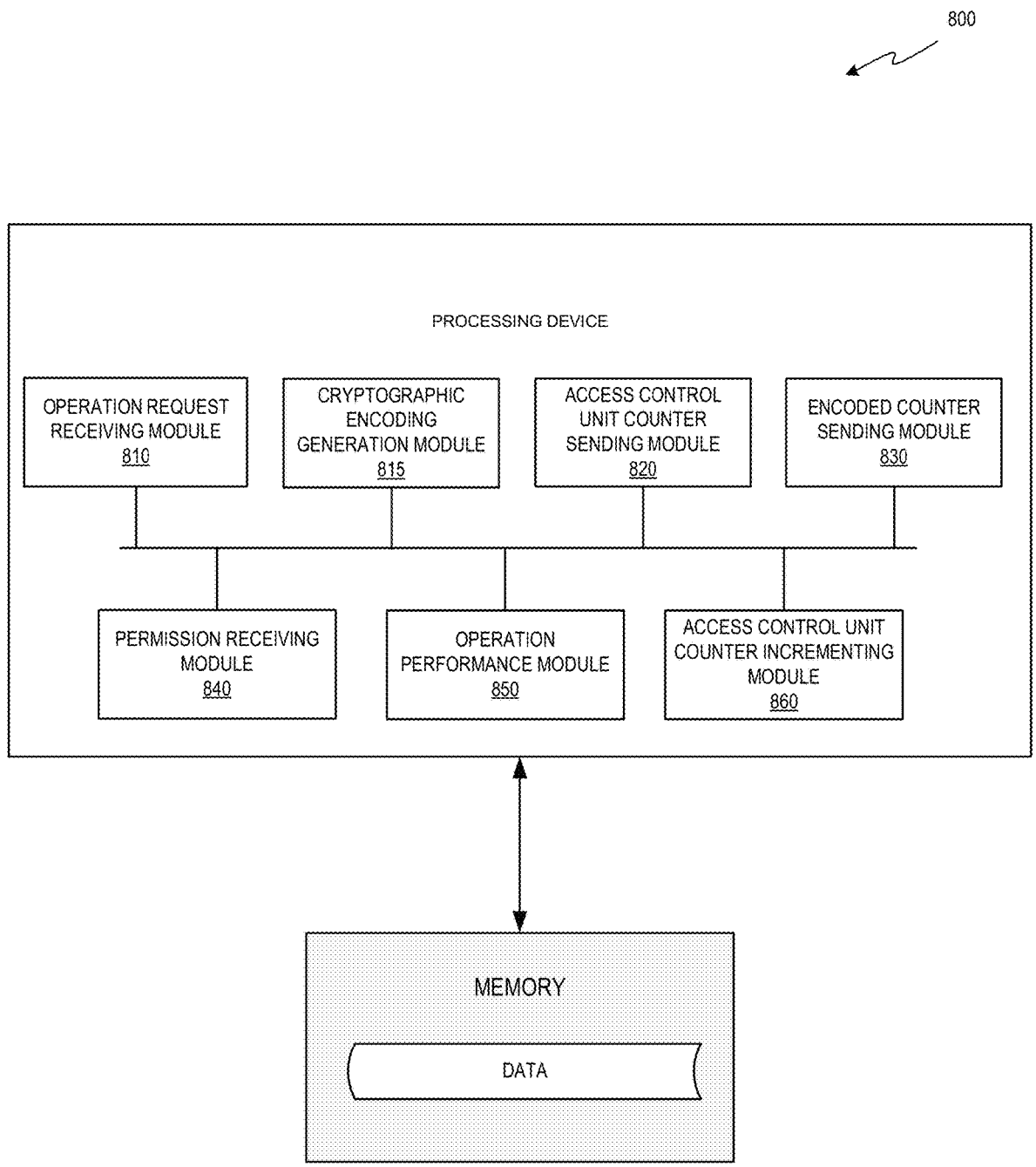

FIG. 8 depicts a block diagram of an example computer system 800 operating in accordance with one or more aspects of the present disclosure. Computer system 800 may be the same or similar to computing device 100 of FIG. 1, and may include one or more processors and one or more memory devices. In the example shown, computer system 800 may include an operation request receiving module 810, a cryptographic encoding generation module 815, an access control unit counter sending module 820, an encoded counter sending module 830, a permission receiving module 840, an operation performance module 850, and an access control unit counter incrementing module 860.

Operation request receiving module 810 may enable a processor to receive, by an access control unit, a request to perform an operation. Cryptographic encoding generation module 815 may enable the processor to, responsive to receiving the request, generate a cryptographic encoding of an access control unit counter using a secret key. Access control unit counter sending module 820 may enable the processor to send, to a key device, the access control unit counter.

Encoded counter sending module 830 may enable the processor to send, to a coordinator service, the access control unit counter and the cryptographic encoding of the access control unit counter. Permission receiving module 840 may enable the processor to receive, from the coordinator service, a response indicating whether permission to perform the operation is granted. Operation performance module 850 may enable the processor to perform the operation if the response indicates that permission is granted. Access control unit counter incrementing module 860 may enable the processor to increment the access control unit counter.

Figure 9:
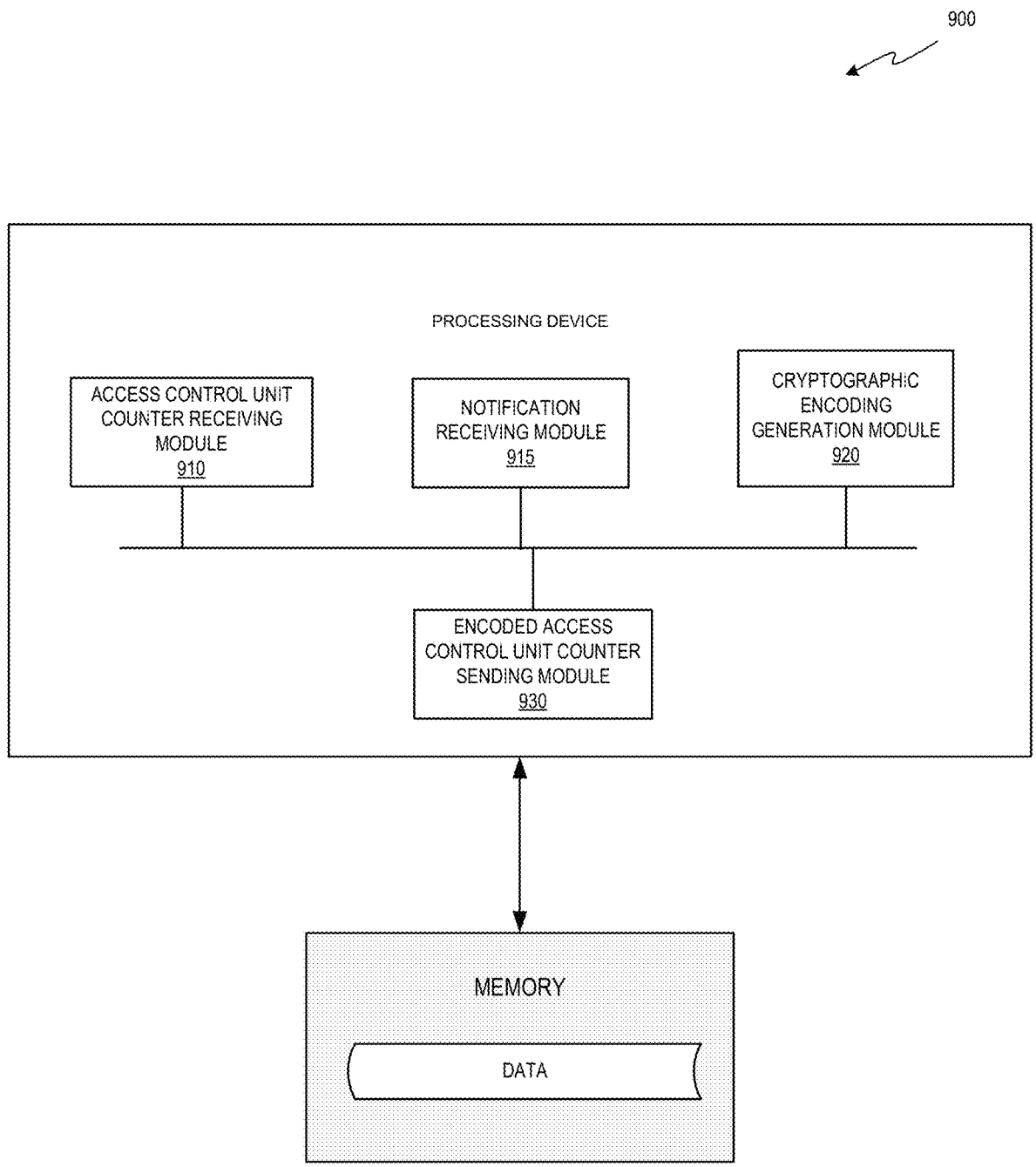

FIG. 9 depicts a block diagram of an example computer system 900 operating in accordance with one or more aspects of the present disclosure. Computer system 900 may be the same or similar to computing device 100 of FIG. 1, and may include one or more processors and one or more memory devices. In the example shown, computer system 900 may include an access control unit counter receiving module 910, a notification receiving module 915, a cryptographic encoding generation module 920, and an encoded access control unit counter sending module 930.

Access control unit counter receiving module 910 may enable a processor to receive, by a key device, an access control unit counter. Notification receiving module 915 may enable the processor to receive, from a coordinator, a notification.

Cryptographic encoding generation module 920 may enable the processor to generate a cryptographic encoding of the received access control unit counter from a secret key. Encoded access control unit counter sending module 930 may enable the processor to send, to a coordinator service, the received access control unit counter and the cryptographic encoding of the received access control unit counter.

Figure 10:
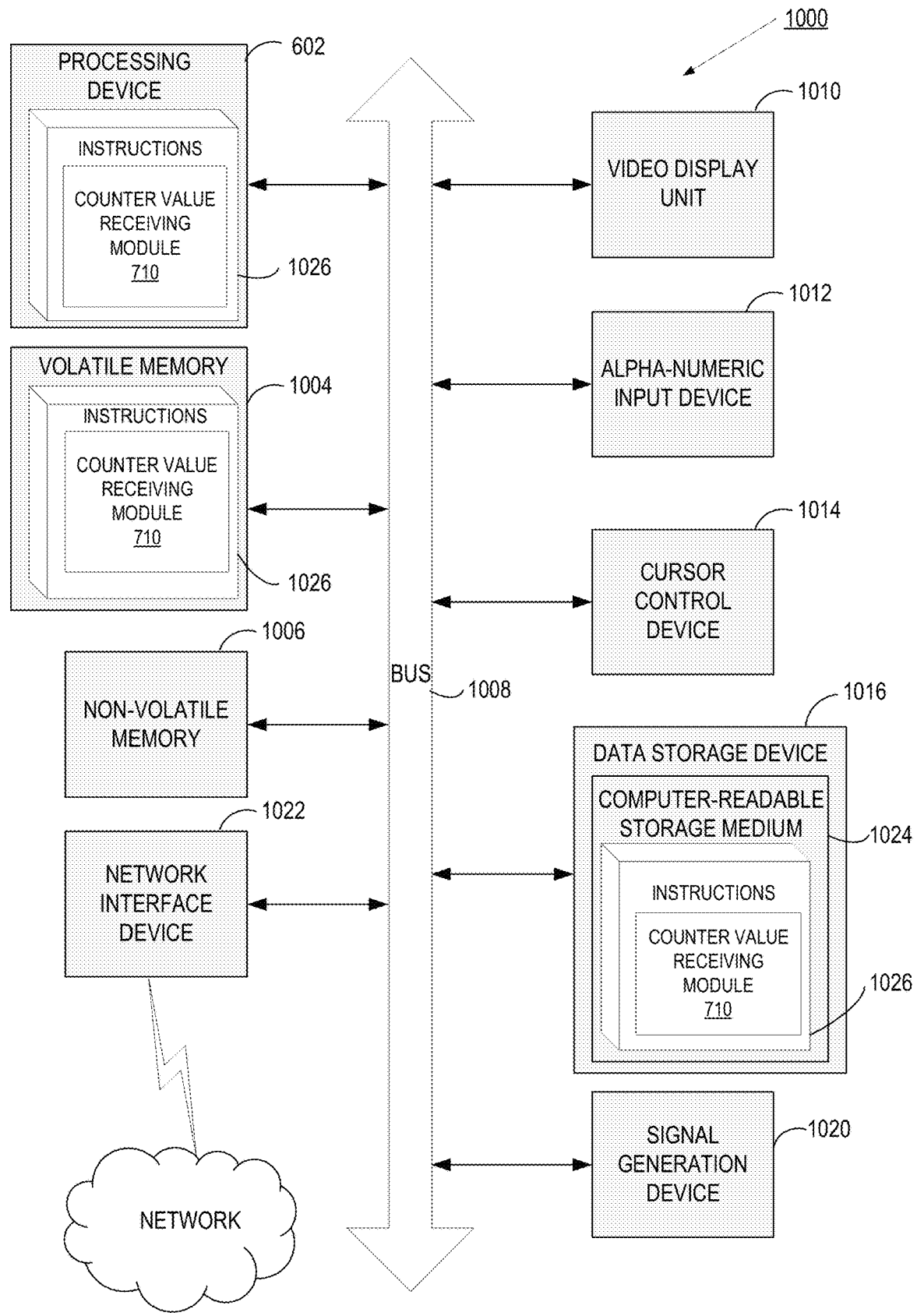
FIG. 10 depicts a block diagram of an illustrative computer system operating in accordance with one or more aspects of the present disclosure.

FIG. 10 depicts a block diagram of a computer system operating in accordance with one or more aspects of the present disclosure. In various illustrative examples, computer system 1000 may correspond to key device 104, access control unit 120, or coordinator 130 of FIG. 1. Computer system 1000 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1006 (e.g., read-only memory (ROM) or electrically-erasable programmable ROM (EEPROM)), and a data storage device 1016, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022.

Computer system 1000 also may include a video display unit 1010 (e.g., an LCD), an alphanumeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing method 400, 401, 500, or 600.

Instructions 1026 may also reside, completely or partially, within volatile memory 1004 and/or within processing device 1002 during execution thereof by computer system 1000, hence, volatile memory 1004 and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a system comprising: a memory device comprising a group of memory units; and a processing device, operatively coupled to the memory device, to perform operations comprising: receiving, from a key device, a first counter value and a first encoded counter value; identifying, among one or more mapping table entries in an access control unit mapping table, an access control unit mapping table entry specifying a second counter value that corresponds to the received first counter value; determining whether a second encoded counter value specified by the identified access control unit mapping table entry corresponds to the received first encoded counter value; and responsive to determining that the second encoded counter value corresponds to the received first encoded counter value, sending, to a control unit, an indication that permission is granted.

Example 2 is the system of example 1, wherein the first encoded counter value comprises a cryptographic encoding of the first counter value generated in view of a secret key.

Example 3 is the system of example 1, wherein determining whether the second encoded counter value specified by the identified access control unit mapping table entry corresponds to the received first encoded counter value comprises determining whether the second encoded counter value is equal to the first encoded counter value.

Example 4 is the system of example 1, wherein the operations are performed by a serverless function hosted by a network-accessible cloud service.

Example 5 is the system of example 1, wherein the operations are performed by the serverless function in response to determining that the first counter value and the first encoded counter value are sent by the key device.

Example 6 is the system of example 1, wherein sending, to the control unit, an indication that permission is granted is further responsive to determining that a time to live specified by the access control unit mapping table is not expired.

Example 7 is the system of example 1, the operations further comprising: storing, in a key device mapping table, a key device mapping entry specifying the first counter value and the first encoded counter value; determining whether a time to live specified by the access control unit mapping table entry is expired; and responsive to determining that the time to live is expired, sending, to the control unit, an indication that permission is denied.

Example 8 is the system of example 1, the operations further comprising: receiving, from an access control unit, a second counter value and a second encoded counter value that comprises a cryptographic encoding of the second counter value generated in view of a secret key; storing, in a control unit mapping table, a control unit mapping entry specifying the second counter value and the second encoded counter value; and sending a notification to a key device.

Example 9 is the system of example 8, wherein the notification comprises a request for the key device to send the first counter value and the first encoded counter value.

Example 10 is a system comprising: a memory device comprising a group of memory units; and a processing device, operatively coupled to the memory device, to perform operations comprising: receiving, from an access control unit, a counter value and an encoded payload, wherein the encoded payload comprises a cryptographic encoding of the counter value generated in view of a secret key; storing, in an access control unit mapping table, an access control unit mapping entry specifying the first counter value and the first encoded counter value; and sending a notification to a key device.

Example 11 is the system of example 10, wherein the access control unit comprises an Engine Control Unit of a vehicle, and the key device comprises a radio transmitter.

Example 12 is the system of example 10, wherein the notification comprises a request for an encoded counter value.

Example 13 is the system of example 10, wherein the control unit mapping entry further specifies an expiration time of the counter value.

Example 14 is a method comprising: receiving, by a computer system of an access control unit, a request to perform an operation; responsive to receiving the request, generating a cryptographic encoding of an access control unit counter in view of a secret key; sending, to a key device, the access control unit counter; sending, to a coordinator service, the access control unit counter and the cryptographic encoding of the access control unit counter; receiving, from the coordinator service, a response indicating whether permission to perform the operation is granted; performing the operation if the response indicates that permission is granted; and incrementing the access control unit counter.

Example 15 is the method of example 14, further comprising: performing a mutual authentication protocol with a key device, wherein the mutual authentication protocol verifies an identity of the key device, wherein receiving the request to perform the operation is responsive to performing the mutual authentication protocol with the key device.

Example 16 is the method of example 14, wherein the operation comprises starting an engine of a vehicle.

Example 17 is the method of example 14, wherein the cryptographic encoding of the access control unit counter comprises a cryptographic hash value generated in view of a combination of the access control unit counter and the secret key.

Example 18 is the method of example 14, wherein the secret key is received by the access control unit from a manufacturer of the access control unit.

Example 19 is a non-transitory machine-readable storage medium storing instructions which, when executed, cause a processor to perform operations comprising: receiving, by a key device, an access control unit counter; receiving, from a coordinator service, a notification; responsive to receiving the notification, generating a cryptographic encoding of the received access control unit counter in view of a secret key; sending, to a coordinator service, the received access control unit counter and the cryptographic encoding of the received access control unit counter.

Example 20 is the system of example 19, wherein the notification comprises a request for the key device to send the received access control unit counter.

Example 21 is the system of example 19, wherein the cryptographic encoding of the received access control counter comprises a cryptographic hash value generated in view of a combination of the received access control unit counter and the secret key.

Example 22 is the method of example 17, wherein the secret key is received by the key device from a manufacturer of the access control unit.

Example 23 is an apparatus comprising: a means for receiving, from a key device, a first counter value and a first encoded payload; a means for identifying, among one or more mapping table entries in an access control unit mapping table, an access control unit mapping table entry specifying a second counter value that corresponds to the received first counter value; a means for determining whether a second encoded counter value specified by the identified access control unit mapping table entry corresponds to the received first encoded counter value; and a means for, responsive to determining that the second encoded counter value corresponds to the received first encoded counter value, sending, to a control unit, an indication that permission is granted.

Example 24 is the apparatus of example 23, wherein the first encoded payload comprises a first encoded counter value, and the first encoded counter value comprises a cryptographic encoding of the first counter value generated in view of a secret key.

Example 25 is the apparatus of example 23, wherein the means for determining whether the second encoded counter value specified by the identified access control unit mapping table entry corresponds to the received first encoded counter value comprise a means for determining whether the second encoded counter value is equal to the first encoded counter value.

Example 26 is the apparatus of example 23, wherein receiving, from the key device, the first counter value and the first encoded payload is responsive to determining that the first counter value and the first encoded payload are sent by the key device.

Example 27 is the apparatus of example 23, wherein sending, to the control unit, an indication that permission is granted is further responsive to determining that a time to live specified by the access control unit mapping table is not expired.

Example 28 is the apparatus of example 23, further comprising: a means for storing, in a key device mapping table, a key device mapping entry specifying the first counter value and the first encoded counter value; and a means for determining whether a time to live specified by the access control unit mapping table entry is expired; and a means for, responsive to determining that the time to live is expired, sending, to the control unit, an indication that permission is denied.

Example 29 is the apparatus of example 23, wherein the notification comprises a request for the key device to send the first counter value and the first encoded payload.

Example 30 is the apparatus of example 23, further comprising: a means for receiving, from an access control unit, a second counter value and a second encoded payload, wherein the second encoded payload comprises a second encoded counter value, wherein the second encoded counter value comprises a cryptographic encoding of the second counter value generated in view of a secret key; a means for storing, in a control unit mapping table, a control unit mapping entry specifying the second counter value and the second encoded counter value; and a means for sending a notification to a key device.

Example 31 is the apparatus of example 30, wherein the access control unit comprises an Engine Control Unit of a vehicle, and the key device comprises a radio transmitter.

Example 32 is the apparatus of example 30, wherein the notification comprises a request for an encoded counter value.

Example 33 is the apparatus of example 30, wherein the control unit mapping entry further specifies an expiration time of the counter value.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400, 401, 500, or 600 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
a memory device; and
a processing device, operatively coupled to the memory device, to:
receive, from a key device, a first counter value and a first encoded counter value;
identify, among one or more mapping table entries in an access control unit mapping table stored in at least one of a memory or a database, an access control unit mapping table entry specifying a second counter value that corresponds to the received first counter value;
determine whether a second encoded counter value specified by the identified access control unit mapping table entry corresponds to the received first encoded counter value; and
responsive to a determination that the second encoded counter value corresponds to the received first encoded counter value, send, to a control unit, an indication that permission is granted.

2. The system of claim 1, wherein the first encoded counter value comprises a cryptographic encoding of the first counter value.

3. The system of claim 1, wherein to determine whether the second encoded counter value specified by the identified access control unit mapping table entry corresponds to the received first encoded counter value, the processing device is configured to determine whether the second encoded counter value is equal to the first encoded counter value.

4. The system of claim 1, wherein to receive the first counter value and the first encoded counter value, identify the access control mapping table entry, determine whether the second encoded counter value specified by the identified access control mapping table entry, and send the indication that the permission is granted, the processing device is to receive the first counter value and the first encoded counter value, identify the access control mapping table entry, determine whether the second encoded counter value specified by the identified access control mapping table entry, and send the indication that the permission is granted by a serverless function hosted by a network-accessible cloud service.

5. The system of claim 1, wherein to receive, from the key device, the first counter value and the first encoded counter value, the processing device is to receive, from the key device, the first counter value and the first encoded counter value responsive to a determination that the first counter value and the first encoded counter value are sent by the key device.

6. The system of claim 1, wherein to send, to the control unit, the indication that the permission is granted, the processing device is to send, to the control unit, the indication that the permission is granted responsive to a determination that a time to live specified by the access control unit mapping table is not expired.

7. The system of claim 1, wherein the processing device is further to:
store, in a key device mapping table, a key device mapping entry specifying the first counter value and the first encoded counter value;
determine whether a time to live specified by the access control unit mapping table entry is expired; and
responsive to a determination that the time to live is expired, send, to the control unit, an indication that the permission is denied.

8. The system of claim 1, wherein the processing device is further to:
receive, from an access control unit, a third counter value and a third encoded counter value that comprises a cryptographic encoding of the second counter value generated in view of a secret key;

store, in a control unit mapping table, a control unit mapping entry specifying the third counter value and the third encoded counter value; and send a notification to the key device.

9. The system of claim 8, wherein the notification comprises a request for the key device to send the first counter value and the first encoded counter value.

10. The system of claim 8, wherein the access control unit comprises an Engine Control Unit of a vehicle, and wherein the key device comprises a radio transmitter.

11. The system of claim 8, wherein the control unit mapping entry further specifies an expiration time of the third counter value stored in the control unit mapping table.

12. The system of claim 8, wherein to receive, from the access control unit, the second counter value and the second encoded counter value, the processing device is configured to receive, from the access control unit, the second counter value and the second encoded counter value responsive to a determination that the second counter value and the second encoded counter value are sent by the access control unit.

13. A method comprising:
receiving, from a key device, a first counter value and a first encoded counter value;
identifying, among one or more mapping table entries in an access control unit mapping table, an access control unit mapping table entry specifying a second counter value that corresponds to the received first counter value;
determining whether a second encoded counter value specified by the identified access control unit mapping table entry corresponds to the received first encoded counter value; and
responsive to determining that the second encoded counter value corresponds to the received first encoded counter value, sending, to a control unit, an indication that permission is granted.

14. The method of claim 13, wherein the first encoded counter value comprises a cryptographic encoding of the first counter value.

15. The method of claim 13, wherein determining whether the second encoded counter value specified by the identified access control unit mapping table entry corresponds to the received first encoded counter value comprises determining whether the second encoded counter value is equal to the first encoded counter value.

16. The method of claim 13, wherein the receiving, the identifying, the determining, and the sending are performed by a serverless function hosted by a network-accessible cloud service.

17. The method of claim 13, wherein receiving, from the key device, the first counter value and the first encoded counter value is responsive to determining that the first counter value and the first encoded counter value are sent by the key device.

18. A non-transitory machine-readable storage medium storing instructions which, when executed by a processing device, cause the processing device to:
receive, from a key device, a first counter value and a first encoded counter value;
identify, among one or more mapping table entries in an access control unit mapping table stored in at least one of a memory or a database, an access control unit mapping table entry specifying a second counter value that corresponds to the received first counter value;
determine whether a second encoded counter value specified by the identified access control unit mapping table entry corresponds to the received first encoded counter value; and
responsive to a determination that the second encoded counter value corresponds to the received first encoded counter value, send, to a control unit, an indication that permission is granted.

19. The non-transitory machine-readable storage medium of claim 18, wherein the first encoded counter value comprises a cryptographic encoding of the first counter value.

20. The non-transitory machine-readable storage medium of claim 18, wherein to determine whether the second encoded counter value specified by the identified access control unit mapping table entry corresponds to the received first encoded counter value, the instructions, when executed by the processing device, cause the processing device to determine whether the second encoded counter value is equal to the first encoded counter value.

* * * * *